United States Patent
Lai et al.

(10) Patent No.: US 8,073,849 B2
(45) Date of Patent: Dec. 6, 2011

(54) METHOD AND SYSTEM FOR CONSTRUCTING DATA TAG BASED ON A CONCEPT RELATION NETWORK

(75) Inventors: Wei-Shen Lai, Taipei County (TW);
Yi-Chi Chen, Taipei County (TW);
Cuo-Yen Lin, Taipei (TW); Wen-Tai Hsieh, Taipei (TW)

(73) Assignee: Institute for Information Industry, Taipei (TW)

( * ) Notice: Subject to any disclaimer, the term of this patent is extended or adjusted under 35 U.S.C. 154(b) by 1012 days.

(21) Appl. No.: 12/005,374

(22) Filed: Dec. 27, 2007

(65) Prior Publication Data
US 2009/0100078 A1 Apr. 16, 2009

(30) Foreign Application Priority Data

Oct. 16, 2007 (TW) .............................. 96138639 A

(51) Int. Cl.
*G06F 7/00* (2006.01)
*G06F 17/30* (2006.01)
(52) U.S. Cl. .................. 707/736; 707/767; 707/803
(58) Field of Classification Search .................. 707/603, 707/732, 733, 734, 736, 767, 803, 959, 999.102
See application file for complete search history.

(56) References Cited

U.S. PATENT DOCUMENTS

| | | | | |
|---|---|---|---|---|
| 6,327,590 B1* | 12/2001 | Chidlovskii et al. | .......... | 707/734 |
| 6,633,868 B1* | 10/2003 | Min et al. | .......... | 707/3 |
| 6,925,433 B2* | 8/2005 | Stensmo | .......... | 704/9 |
| 7,130,848 B2* | 10/2006 | Oosta | .......... | 707/5 |
| 7,685,200 B2* | 3/2010 | Gunawardena et al. | ...... | 707/748 |
| 7,725,422 B2* | 5/2010 | Ryan et al. | .......... | 707/709 |
| 2002/0073079 A1* | 6/2002 | Terheggen | .......... | 707/3 |
| 2002/0178223 A1* | 11/2002 | Bushkin | .......... | 709/205 |
| 2007/0203885 A1* | 8/2007 | Kim et al. | .......... | 707/2 |
| 2008/0228806 A1* | 9/2008 | Davies et al. | .......... | 707/102 |
| 2009/0150342 A1* | 6/2009 | Muller et al. | .......... | 707/3 |

FOREIGN PATENT DOCUMENTS

JP 2004-21913 A 1/2004

OTHER PUBLICATIONS

Eda et al., "Towards Automatic Web Page Classification based on Tags in Folksonomies", IPSJ SIG Techinical Reports, vol. 143, No. 58, pp. 405-410, Jul. 3, 2007.
Liu et al., "The multimedia data recommendation search system using metadata", DICOMO, pp. 133-136, Jul. 2002.
Touge et al., "Extracting Opinion Sentence Adapted to Topic using Iteration Learning", IPSJ SIG Technical Report, pp. 43-50, Nov. 26, 2004.

* cited by examiner

*Primary Examiner* — Marc Somers
(74) *Attorney, Agent, or Firm* — Birch, Stewart, Kolasch & Birch, LLP

(57) ABSTRACT

A system for constructing data tag based on a concept relation network is disclosed. A tagging module collects input tags from users to create a tag table accordingly. A count of each tag used is calculated and compared with a predefined threshold value to generate two tag count tables. Relations between each tag and others are calculated. Additionally, an incremental concept is applied to maintain tags in the concept relation network.

24 Claims, 8 Drawing Sheets

METHOD AND SYSTEM FOR CONSTRUCTING DATA TAG BASED ON A CONCEPT RELATION NETWORK

BACKGROUND OF THE INVENTION

1. Field of the Invention

The invention relates to a data constructing method and system, and more particularly to a method and system for constructing data tag based on a concept relation network.

2. Description of the Related Art

With the popular application of communication networks and information technology, digital documents are being produced and accumulated at a much faster pace, resulting in increased issues and requirements for management, organization, access, and utilization of the digital documents. As a result, "Automatic Information Organization and Subject Analysis for Digital Documents" and "Text Knowledge Discovery" are provided, comprising information retrieval, natural language processing, machine learning, and the like.

Knowledge discovery (KD) technology empowers development of next generation database management and information systems through the abilities to extract new, insightful information embedded within large heterogeneous databases and to formulate knowledge.

Knowledge discovery comprises data mining and text mining due to different data characteristics. Data mining is used for structured data, wherein each piece of data comprises a common field to be recorded in a database. Text mining processes unstructured data, which have no applicable structures between each piece of data. Knowledge discovery collects data, sorts the data, transforms the data, performs the mining processes, and represents and analyzes results using association, classification, clustering, summarization, prediction, and sequence analysis.

Based on the different data characteristics, data mining and text mining provide different steps and process details. Data mining is the principle of sorting through large amounts of data and picking out relevant information. It is usually used by business intelligence organizations, and financial analysts, but it is increasingly being used in the sciences to extract information from the enormous data sets generated by modern experimental and observational methods. It has been described as "the nontrivial extraction of implicit, previously unknown, and potentially useful information from data" and "the science of extracting useful information from large data sets or databases". Text mining, sometimes alternately referred to as text data mining, refers generally to the process of deriving high quality information from text. High quality information is typically derived through the dividing of patterns and trends through means such as statistical pattern learning. Text mining usually involves the process of structuring the input text (usually parsing, along with the addition of some derived linguistic features and the removal of others, and subsequent insertion into a database), deriving patterns within the structured data, and finally evaluating and interpreting of the output. 'High quality' in text mining usually refers to some combination of relevance, novelty, and interestingness. Typical text mining tasks include text categorization, text clustering, concept/entity extraction, production of granular taxonomies, sentiment analysis, document summarization, and entity relation modeling (i.e., learning relations between named entities).

Data mining and text mining can be further applied to construct data tags, for example, browsing tags for the Internet search, which is hierarchical concept space construction. The hierarchical concept space construction is applied to collaborative tagging of Folksnomy classification, constructing hierarchical concept space by estimating the relation intensity between tags.

Convention tag construction methods comprise drawbacks described as follows. "Tag Organization Methods and Systems" result in more maintenance cost. "Visual Tags for Search Results Generated from Social Network Information" does not provide a weighting concept, resulting in difficult searches. With respect to "Improving Search and Exploration in The Tag Space for Automated Tag Clustering", the numeric is not normalized such that maintenance cost for a tree structure is greater.

As described, the invention provides a method and system for constructing data tag based on a concept relation network, maintaining concept space by increment to reduce cost time and system resource of recalculation of tag count values, relations, and weightings.

BRIEF SUMMARY OF THE INVENTION

The invention provides systems for constructing data tag based on a concept relation network. An exemplary embodiment of a system for constructing data tag based on a concept relation network comprises a tagging module, a first tag generator, a second tag generator, and a confidence generator. The tagging module collects tags input by a user to create a tag data table. The first tag generator calculates counts of each tag used according to the tag data table to generate a first tag count table, compares, respectively, each tag count value of each tag stored in the first tag count table with a first predefined threshold value, determines whether each of the tag count values is less than the first predefined threshold value, and discards tags with tag count values less than the first predefined threshold value to generate a second tag count table. The second tag generator calculates counts of each tag-pair used according to the second tag data table to generate a first tag-pair count table, compares, respectively, each tag-pair count value of each tag-pair stored in the first tag-pair count table with a second predefined threshold value, determines whether each of the tag-pair count values is less than the second predefined threshold value, and discards tag-pairs with tag-pair count values less than the second predefined threshold value to generate a second tag-pair count table. The confidence generator calculates relations between each tag or tag-pair and others according to the first and first tag-pair count tables to generate a tag relation table.

The invention provides methods for constructing data tag based on a concept relation network. An exemplary embodiment of a method for constructing data tag based on a concept relation network comprises the following. Tags input by a user are collected to create a tag data table. Counts of each tag used are calculated according to the tag data table to generate a first tag count table. Each tag count value of each tag stored in the first tag count table is compared, respectively, with a first predefined threshold value. It is determined whether each of the tag count values is less than the first predefined threshold value. Tags with tag count values less than the first predefined threshold value are discarded to generate a second tag count table. Counts of each tag-pair used according to the second tag data table are calculated to generate a first tag-pair count table. Each tag-pair count value of each tag-pair stored in the first tag-pair count table is compared, respectively, with a second predefined threshold value. It is determined whether each of the tag-pair count values is less than the second predefined threshold value. Tag-pairs with tag-pair count values less than the second predefined threshold value are discarded to generate a second tag-pair count table. Relations between each tag or tag-pair and others are calculated according to the first and first tag-pair count tables to generate a tag relation table.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
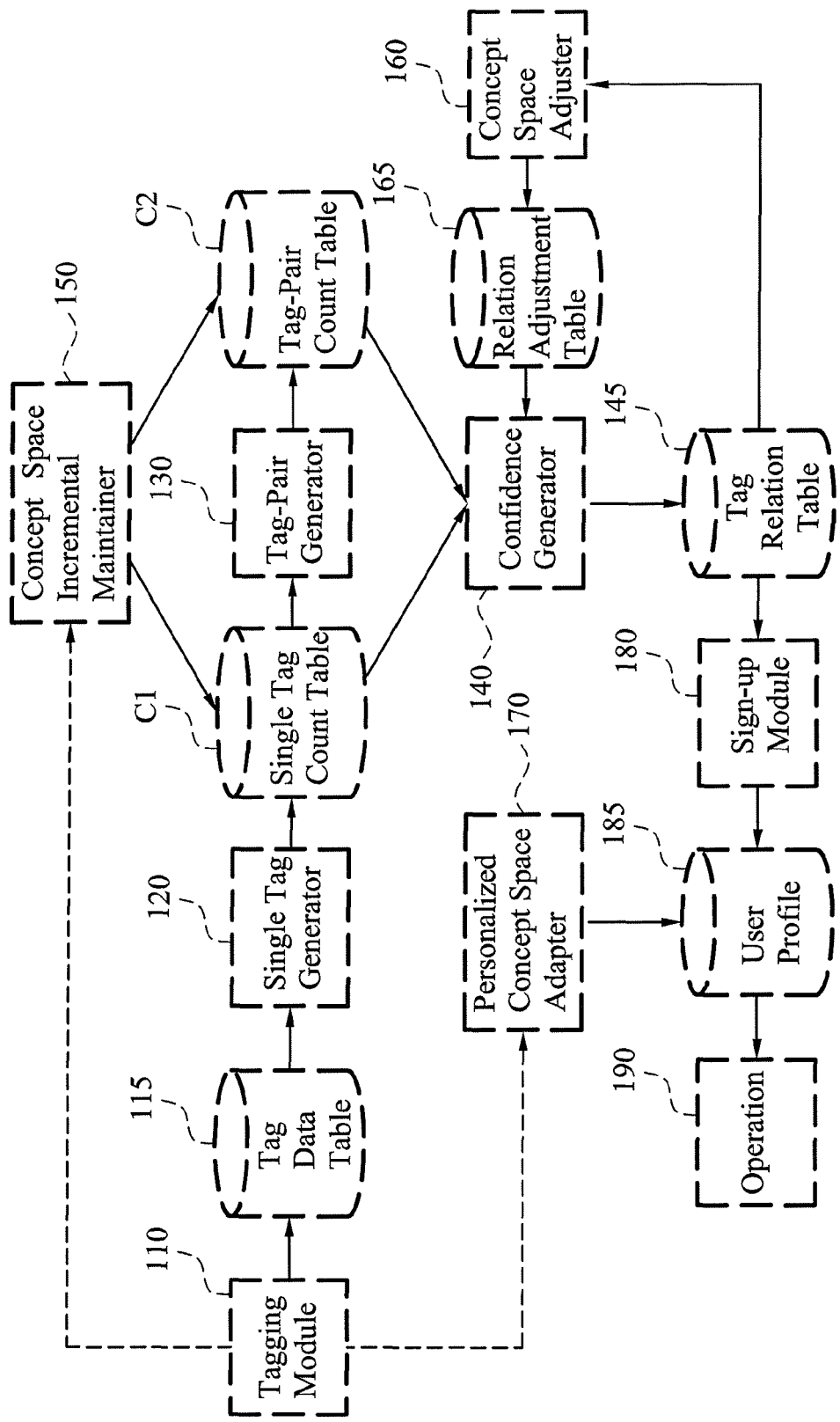
FIG. 1 is a schematic view of a system for constructing data tag based on a concept relation network of the present invention.

Several exemplary embodiments of the invention are described with reference to FIGS. 1 through 8, which generally relate to data tag construction based on a concept relation network. It is to be understood that the following disclosure provides various different embodiments as examples for implementing different features of the invention. Specific examples of components and arrangements are described in the following to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system for constructing data tag based on a concept relation network.

FIG. 1 is a schematic view of a system for constructing data tag based on a concept relation network of the present invention.

An embodiment of a system for constructing data comprises a tagging module 110, a single tag generator 120, a tag-pair generator 130, a confidence generator 140, a concept space incremental maintainer 150, a concept space adjuster 160, a personalized concept space adapter 170, and a sign-up module 180.

Figure 2:
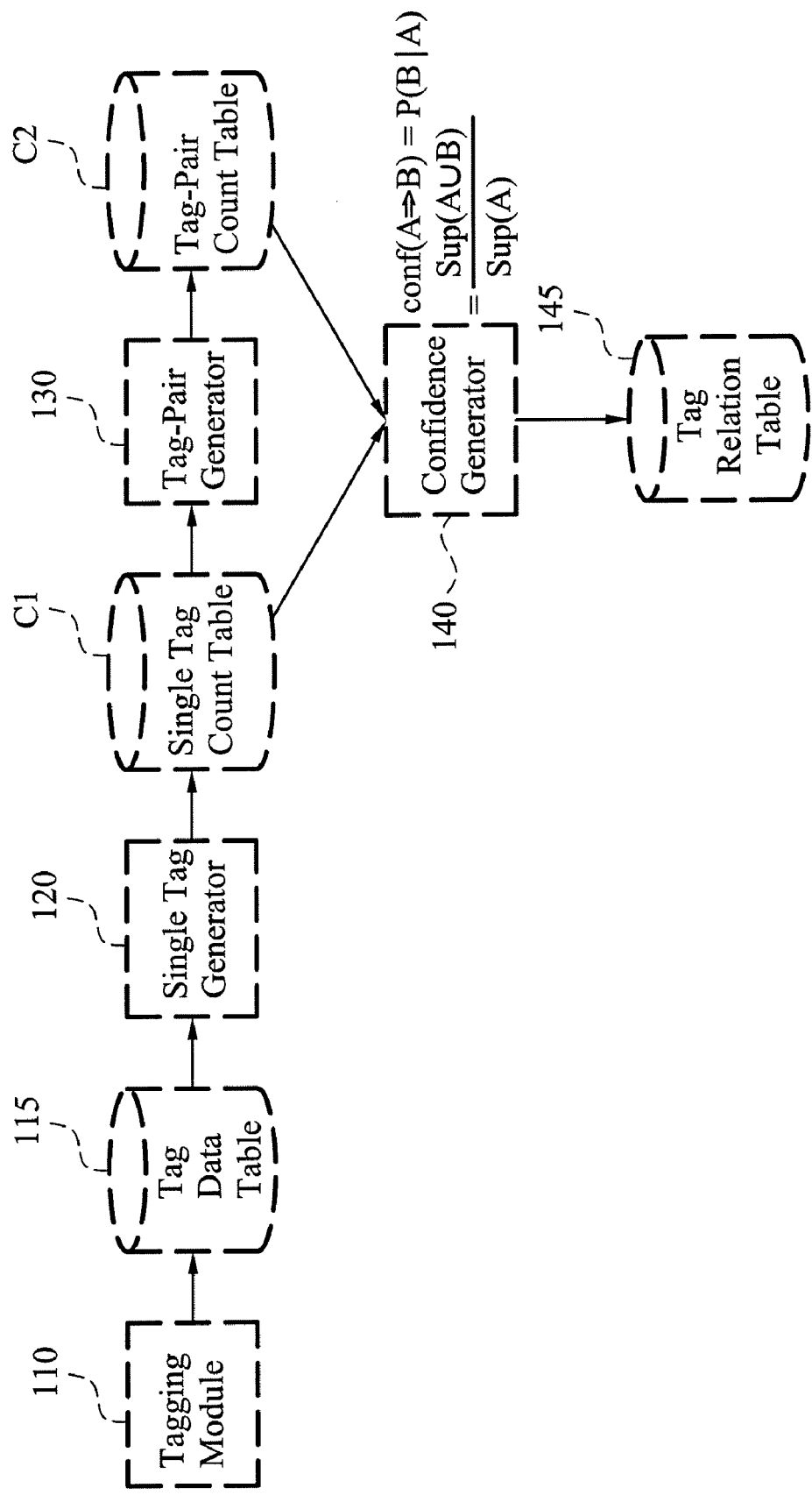
FIG. 2 is a schematic view of tag relation rules for constructing concept space of the present invention.

FIG. 2 is a schematic view of tag relation rules for constructing concept space of the present invention.

Figure 3:
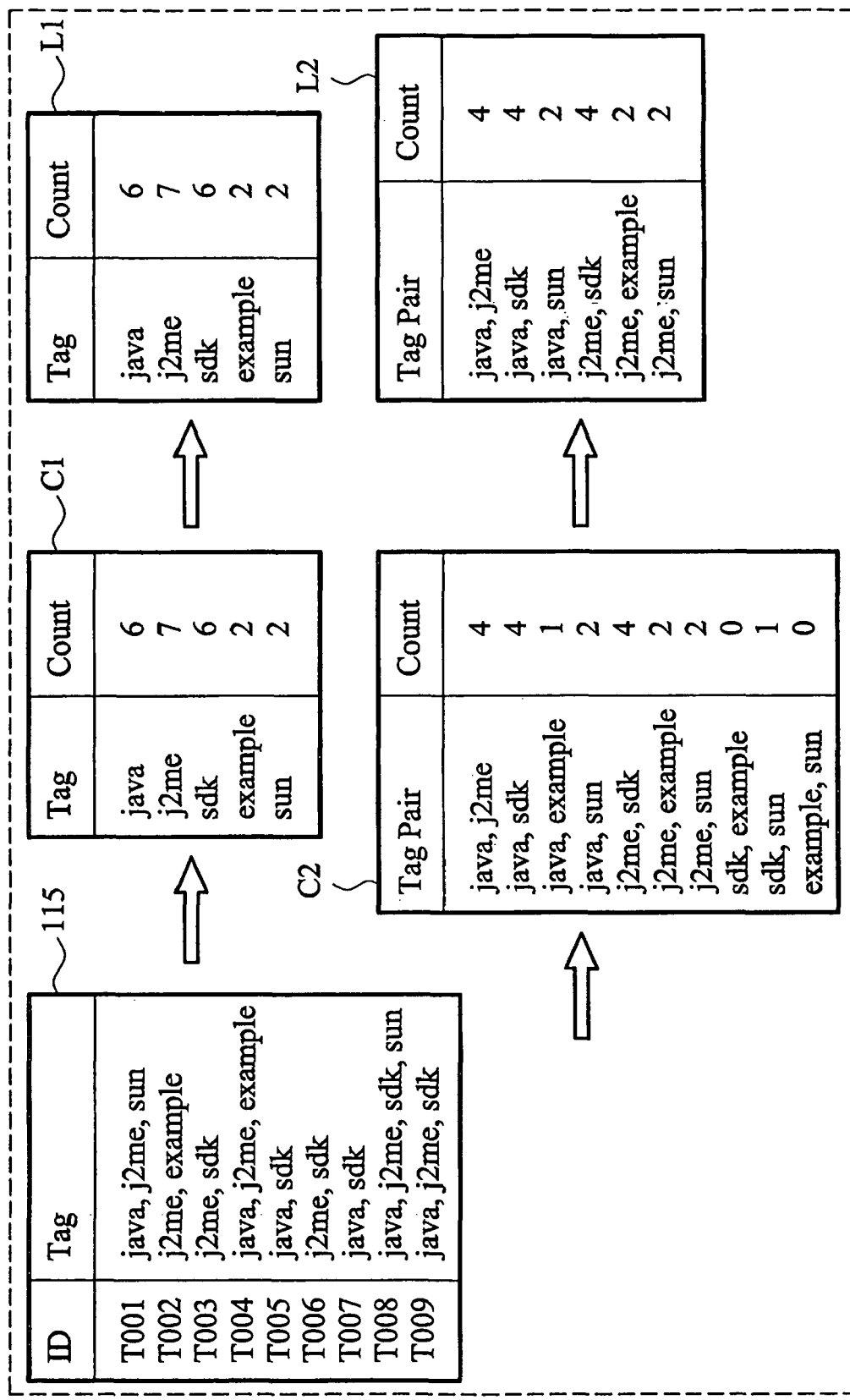
FIG. 3 is a schematic view of constructing tag count tables of the present invention.

Referring to FIGS. 2 and 3, the tagging module 110 collects user input tags or selected keywords (i.e. tag data) to generate tag data table 115. The generate tag data table 115 at least comprises a content identity field (Content ID) and a tag field (Tag). Content IDs are represented by T001, T002, T003, and the like. In this embodiment, input or selected tags at least comprise, but is not limited to, java, j2me, sun, example, and sdk, symbolized by T001~T009 respectively. As shown in the tag data table 115, T001 represents that java, j2me, and sun keywords are used to search data simultaneously, T002 represents that j2me and example keywords are used to search data simultaneously, and so forth.

The single tag generator 120 calculates counts of each tag (i.e. keywords) used according to the tag data table 115 to generate a single tag count table C1. The single tag count table C1 at least comprises a tag field and a count field, and a value of each count field representing a used count of a corresponding tag.

The single tag generator 120 compares, respectively, each tag count value of each tag stored in the single tag count table C1 with a predefined threshold value, and determines whether each of the tag count values is less than the predefined threshold value. It is noted that the predefined threshold value is, but is not limited to, 2 in this embodiment. The single tag generator 120 discards tags with tag count values less than the predefined threshold value to generate a single tag count table L1 (not shown). The single tag count table L1 at least comprises a tag field and a count field, and a value of each count field representing a used count of a corresponding tag which is greater than the predefined threshold value. Since each of the tag count values for java, j2me, sun, example, and sdk are equal to or greater than 2, all the tags in the single tag count table C1 are not discarded, such that the single tag count tables C1 and L1 comprise identical data contents.

The tag-pair generator 130 calculates counts of any two tags (tag-pair) of java, j2me, sun, example, and sdk, used simultaneously, according to user input/selection and the single tag data table L1 to generate a tag-pair count table C2. The tag-pair count table at least comprises a tag field and a count field, and a value of each count field representing a used count of a corresponding tag-pair. As shown in the tag-pair count table C2, sdk, example, and sun tags are used for 6, 2, and 2 times respectively but [sdk/example], [sdk/sun], and [example/sun] tag-pairs are respectively and simultaneously input/selected for only 0, 1, and 0 times.

The tag-pair generator 130 compares, respectively, each tag-pair count value of each tag-pair stored in the tag-pair count table C2 with a predefined threshold value, and determines whether each of the tag-pair count values is less than the predefined threshold value. It is noted that the predefined threshold value is, but is not limited to, 2 in this embodiment. The tag-pair generator 130 discards tag-pairs with tag-pair count values less than the predefined threshold value to generate a tag-pair count table L2. The tag-pair count table L2 at least comprises a tag field and a count field, and a value of each count field representing a used count of a corresponding tag-pair which is greater than the predefined threshold value. Since each of the count values of [java/example], [sdk/example, [sdk/sun], and [example/sun] the tag-pairs is less than 2, the tag-pairs must be discarded, such that each of the count values of all the tag-pairs stored in the tag-pair count table L2 is equal to or greater than 2.

When creation of the single tag count tables C1 and L1 and the tag-pair count tables C2 and L2 are complete, the confidence generator 140 calculates relations between each tag or tag-pair and others using a formula according to the single tag count table C1 and the tag-pair count table C2 to generate a tag relation table 145, the formula represented as:

$$conf(A \Rightarrow B) = P(B|A) = \frac{Sup(A \cup B)}{Sup(A)},$$

where A represents a tag (tag A, for example) stored in the single tag count table C1 while B represents a tag, stored in the tag-pair count tables C2, relating to the tag A. Thus, relation operations relating to current data tags for space concept are complete, locating relations between different data tags, such that related data corresponding to input tags can be provided expediently when data is search.

Figure 4:
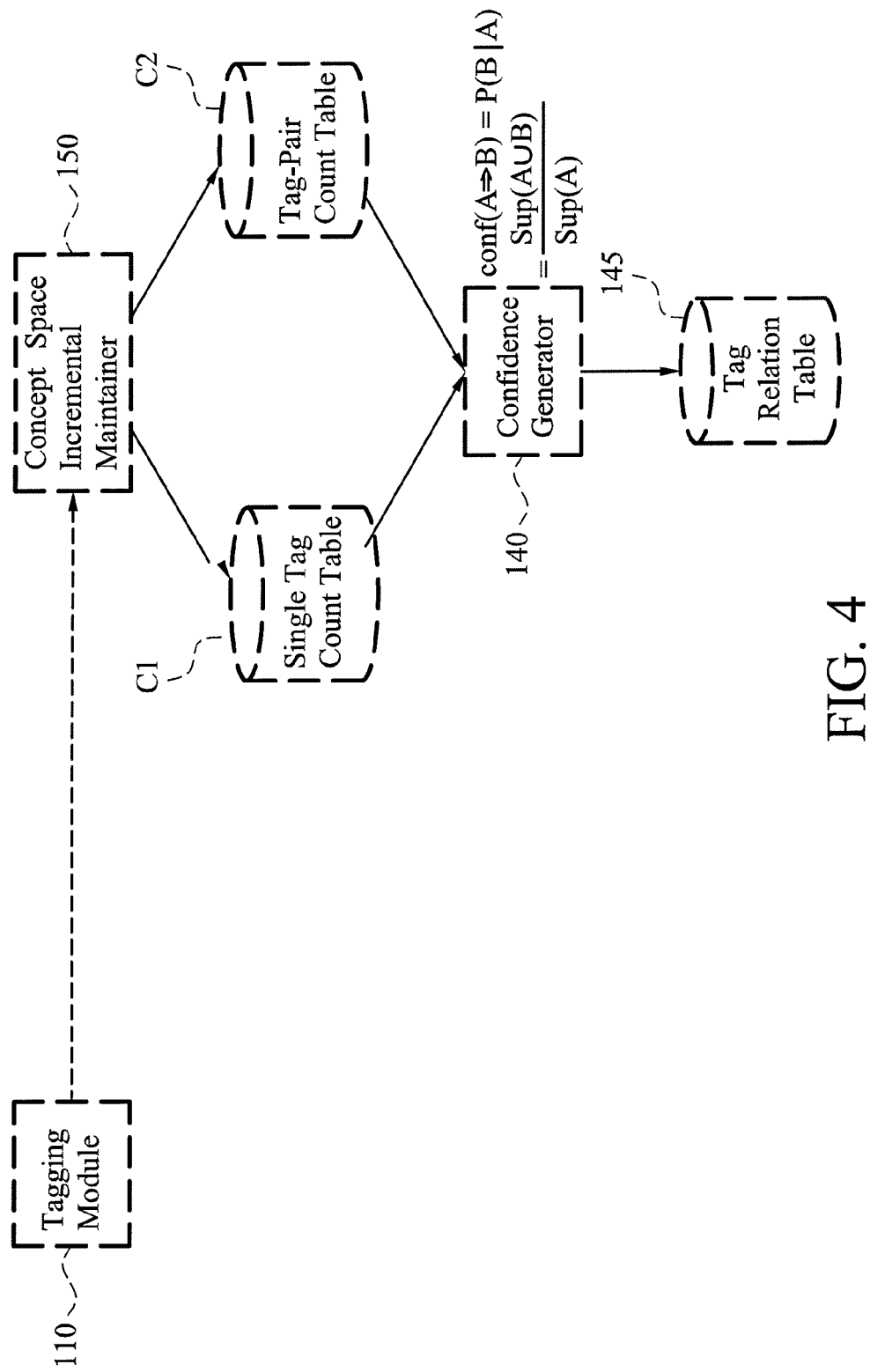
FIG. 4 is a schematic view of adding data tags of concept space of the present invention.

FIG. 4 is a schematic view of adding data tags of concept space of the present invention.

Figure 5:
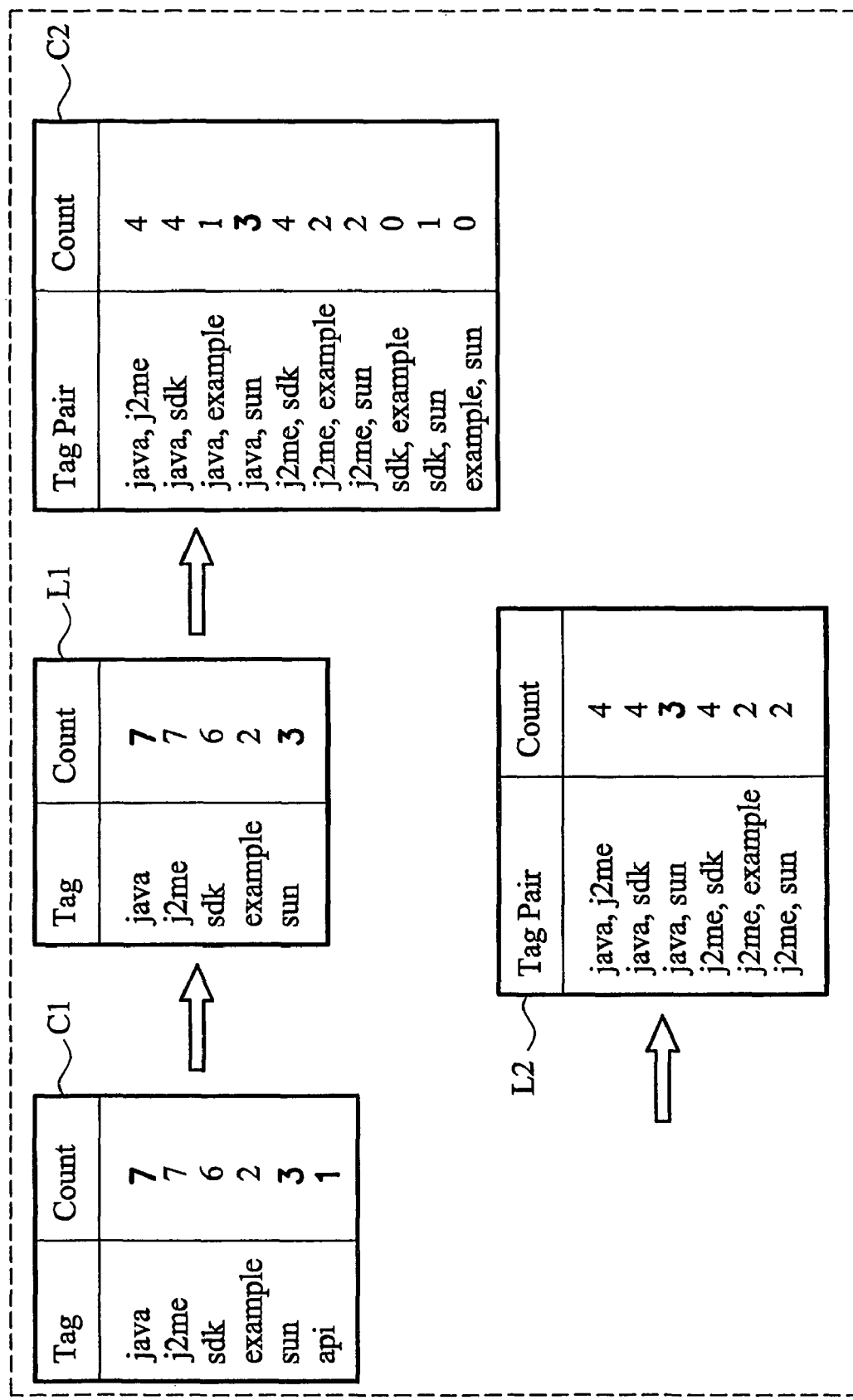
FIG. 5 is a schematic view of adding tag count tables of the present invention.

Referring to FIGS. 4 and 5, when users input or select a new keyword (i.e. tag data), the tagging module 110 collects and transfers the new tag to the concept space incremental maintainer 150. When receiving the new tag, the concept space incremental maintainer 150 adds the new tag to the single tag data table C1. Compared with the single tag data table C1 shown in FIG. 3, in FIG. 5, new added tags comprise java, sun, and api, so each of the count values thereof are added by 1 to become 7, 3, and 1. The concept space incremental maintainer 150 compares, respectively, each tag count value of each updated tag stored in the tag count table C1 with the predefined threshold value, and determines whether each of the tag count values of the updated tags is less than the predefined threshold value to determine whether contents of the tag count table L1 have been changed. It is noted that the updated tags indicate newly added tags or tags with increased count values.

If the contents of the tag count table L1 have been changed, the concept space incremental maintainer 150 adds the updated tags to the tag-pair count table C2 according to user input/selection and the tag count table L1 and updates contents of the tag and count fields. As shown in the tag-pair count table C2, the count value of the [java/sun] tag-pair is added by 1. The concept space incremental maintainer 150 compares, respectively, each tag-pair count value of each updated tag-pair stored in the tag-pair count table C2 with the predefined threshold value and discards tag-pairs with tag-pair count values less than the predefined threshold value to update the tag-pair count table L1. It is noted that the updated tag-pairs indicate newly added tag-pairs or tag-pairs with increased count values.

Similarly, the confidence generator 140 calculates relations between each tag or tag-pair and others using the formula $$conf(A \Rightarrow B) = P(B|A) = \frac{Sup(A \cup B)}{Sup(A)}$$

according to the single tag count table C1 and the tag-pair count table C2 to update the content of the tag relation table 145.

It is noted that the concept space incremental maintainer 150 updates the single tag count table C1 and the tag-pair count table C2 when a new tag is received, such that recalculation and re-comparison for count values of each tag or tag-pair are not required, substantially improving system performance.

If the contents of the tag count table L1 are not changed, the concept space incremental maintainer 150 only adds the new tag, which must be a tag-pair, to the tag-pair count table C2 and determines whether update for the tag-pair count table L2 is required. It is noted that single tags and tag-pairs are described in this embodiment but are not to be limitative. A tag-set comprising 3, 4, or more tags can be applied. Thus, each of the count values of each tag-set are calculated to generate a tag-set count table Cn and is compared with a predefined threshold value to generate a tag-set count table Ln.

Figure 6:
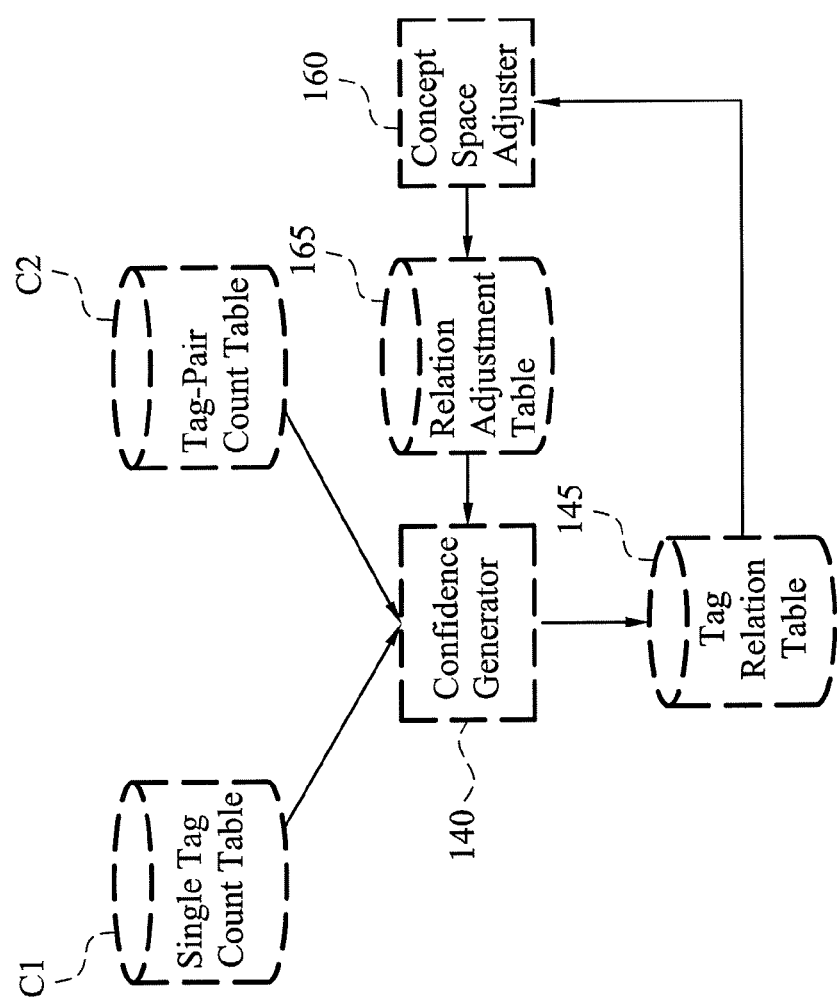
FIG. 6 is a schematic view of updating tag relations of concept space of the present invention.

FIG. 6 is a schematic view of updating tag relations of concept space of the present invention.

When an input tag is received, the concept space adjuster 160 provides tags comprising preferable relations for the input tag according to the tag relation table 145 for user selection. When a tag (tag A, for example) relating to the input tag is selected, the concept space adjuster 160 adjusts relation between the tag A and the input tag using a formula or according to preset weightings to generate a relation adjustment table 165, the formula represented as:

$$conf(A \Rightarrow B) = \frac{Sup(A \cup B) + offset(A \Rightarrow B)}{Sup(A) + offset(A \Rightarrow B)},$$

where A represents a tag (tag A, for example) stored in the single tag count table C1 while B represents a tag, stored in the tag-pair count table C2, relating to the tag A. Thus, update relating to the tag relation for space concept is complete.

Figure 7:
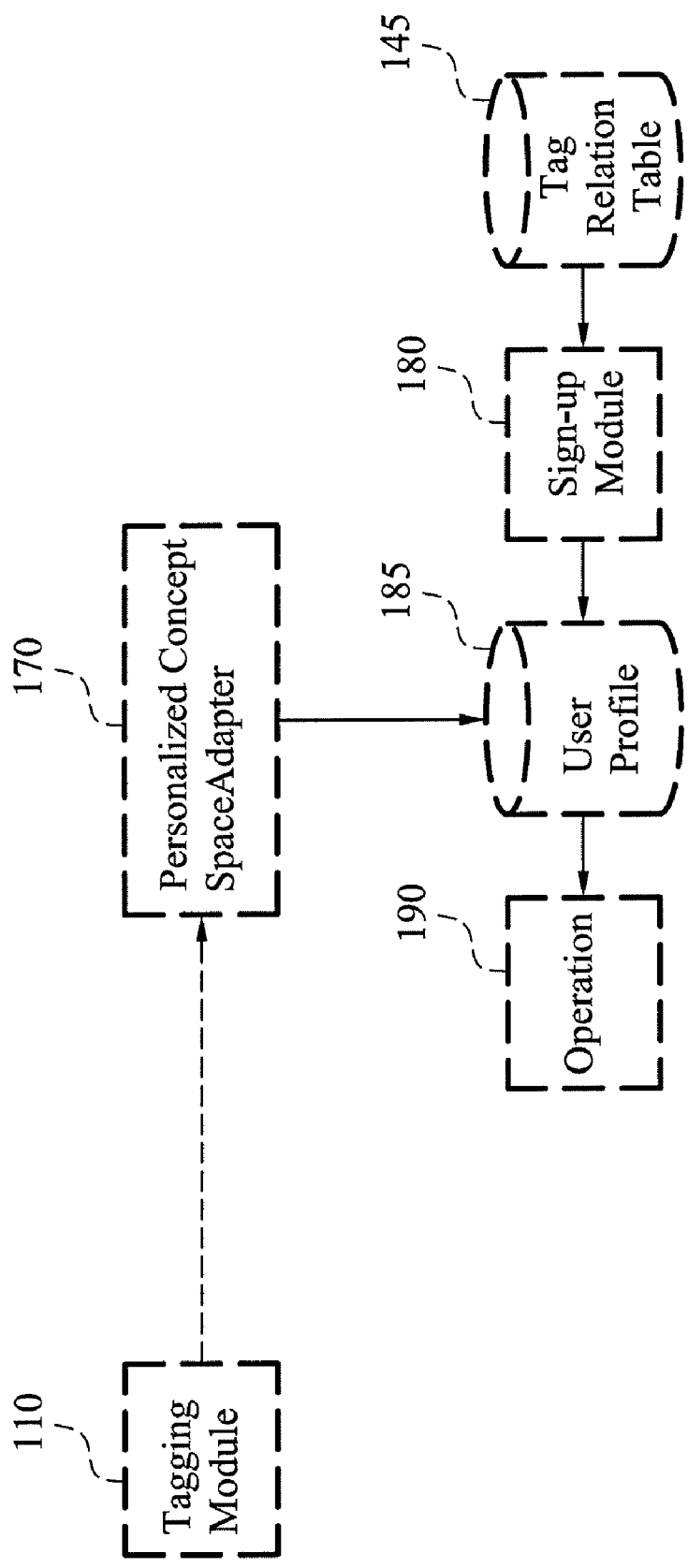
FIG. 7 is a schematic view of implementing tag weightings for concept space personalization of the present invention.

FIG. 7 is a schematic view of implementing tag weightings for concept space personalization of the present invention.

When a user logs into a search system of the present invention, the sign-up module 180 retrieves a personal profile 185 corresponding to the tag relation table 145. Tags and corresponding relations stored in the personal profile 185 may form a personal profile graphic chart G (not shown). Each tag represents a node and the corresponding relation represents an edge connecting two relative tags. The tagging module 110 obtains a new tag according to user input and transfers the new tag to the personalized concept space adapter 170. When receiving the new tag, the personalized concept space adapter 170 decreases relation of the tag relating to the personal profile 185 with a fixed ratio using a formula, represented as:

$$w_i = w - \rho \times w_i.$$

If the received tag (tag $t_i$, for example) has not been stored in the tag relation table 145, the tag $t_i$ is added to the tag relation table 145, and a node corresponding thereto is added to the personal profile graphic chart G (not shown). Relations between the $t_i$ and an existing tag $t_j$ are calculated and corresponding edges are added to the personal profile graphic chart G (not shown), in which the edge of the nodes $t_i$ and $t_j$ are assigned an initial weighting α. If the received tag (tag $t_i$, for example) has been stored in the tag relation table 145, relation between tags $t_i$ and $t_j$ in the tag relation table 145 is increased and the edge between the nodes $t_i$ and $t_j$ personal profile graphic chart G (not shown) is increased by a weighting β. The system provides users for different operations 190, comprising search, suggestions, and so on.

In an embodiment of a system for constructing data tag display tags in common use according to user search habits for direct selection, the most used tags are assigned greater weightings and others are assigned less weighting.

Figure 8:
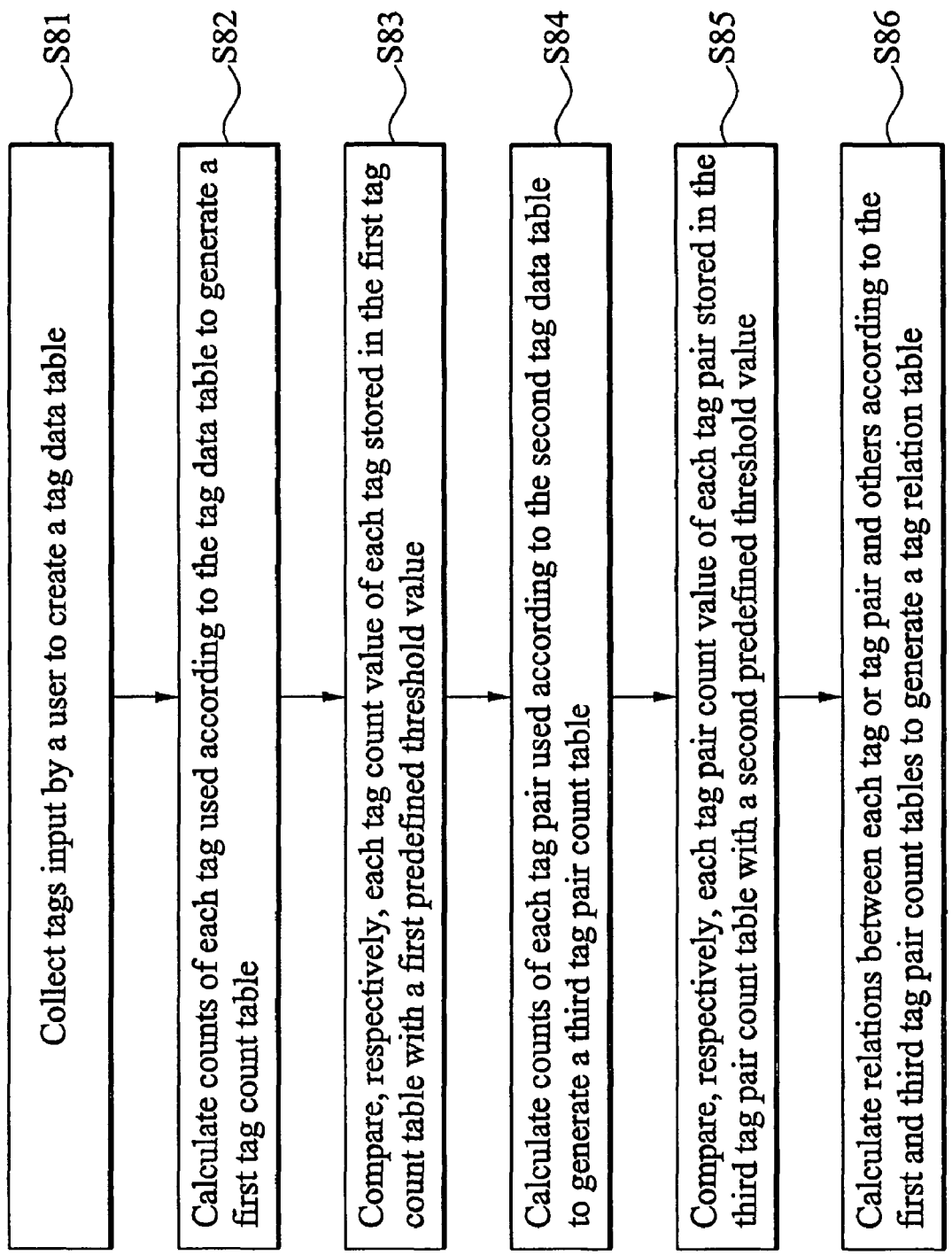
FIG. 8 is a flowchart of a method for constructing data tag based on a concept relation network of the present invention.

FIG. 8 is a flowchart of a method for constructing data tag based on a concept relation network of the present invention.

Tags input by a user are collected using a tagging module to create a tag data table (step S81). Counts of each tag used are calculated according to the tag data table to generate a first tag count table (the single tag count table C1) (step S82). Each tag count value of each tag stored in the first tag count table is compared, respectively, with a first predefined threshold value, and tags with tag count values less than a first predefined threshold value are discarded to generate a second tag count table (the single tag count table L1) (step S83). Counts of each tag-pair used according to the second tag data table are calculated to generate a first tag-pair count table (the tag-pair count table C2) (step S84). Each tag-pair count value of each tag-pair stored in the first tag-pair count table is compared, respectively, with a second predefined threshold value, and tag-pairs with tag-pair count values less than a second predefined threshold value are discarded to generate a second tag-pair count table (the tag-pair count table L2) (step S85). Relations between each tag or tag-pair and others are calculated according to the first tag count table and the first tag-pair count table using a formula to generate a tag relation table (step S86), wherein the formula is represented as:

$$conf(A \Rightarrow B) = P(B|A) = \frac{Sup(A \cup B)}{Sup(A)},$$

where A represents a tag (tag A, for example) stored in the single tag count table C1 while B represents a tag, stored in the tag-pair count table C2, relating to the tag A. Thus, relation operations relating to current data tags for space concept are complete, locating relations between different data tags, such that related data corresponding to input tags can be provided expediently when data is search.

Implementation of addition of data tags based on a concept relation network, calculation or adjustment of relations between tags, and personalized adjustment of tag weightings can be referred to in FIGS. 4 through 7, which are not further described.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for constructing data tag based on a concept relation network, comprising:
    collecting tags input by a user to create a tag data table;
    calculating counts of each tag used according to the tag data table to generate a first tag count table;
    comparing, respectively, each tag count value of each tag stored in the first tag count table with a first predefined threshold value;
    determining whether each of the tag count values is less than the first predefined threshold value;
    discarding tags with tag count values less than the first predefined threshold value to generate a second tag count table;
    calculating counts of each tag-pair used according to the second tag data table to generate a first tag-pair count table;
    comparing, respectively, each tag-pair count value of each tag-pair stored in the first tag-pair count table with a second predefined threshold value;
    determining whether each of the tag-pair count values is less than the second predefined threshold value;
    discarding tag-pairs with tag-pair count values less than the second predefined threshold value to generate a second tag-pair count table; and
    calculating relations between each tag and other relating tags by using a formula $$conf(A \Rightarrow B) = P(B|A) = \frac{Sup(A \cup B)}{Sup(A)}$$

according to the first tag count table and the first tag-pair count table to generate a tag relation table, wherein A represents a tag stored in the first tag count table and B represents a tag, stored in the first tag-pair count table, relating to the tag A.

2. The method for constructing data tag based on a concept relation network as claimed in claim 1, further comprising:
    adding updated received tags to the first tag count table;
    comparing, respectively, each tag count value of each updated tag stored in the first tag count table with the first predefined threshold value;
    determining whether each of the tag count values of the updated tags is less than the first predefined threshold value to determine whether contents of the second tag count table have been changed;
    if changed, adding the updated tags to the first tag-pair count table according to the second tag count table;
    comparing, respectively, each tag-pair count value of each updated tag-pair stored in the first tag-pair count table with the second predefined threshold value; and
    discarding tag-pairs with tag-pair count values less than the second predefined threshold value to update the second tag-pair count table.

3. The method for constructing data tag based on a concept relation network as claimed in claim 2, further comprising calculating relations between each tag and other relating tags by using the formula $$conf(A \Rightarrow B) = P(B|A) = \frac{Sup(A \cup B)}{Sup(A)}$$

according to the first tag count table and the first tag-pair count table to update the tag relation table.

4. The method for constructing data tag based on a concept relation network as claimed in claim 2, further comprising, if the contents of the second tag count table are not changed, adding the updated tags to the first tag-pair count table and determining whether update for the second tag-pair count table is required.

5. The method for constructing data tag based on a concept relation network as claimed in claim 1, further comprising:

providing tags comprising preferable relations for the input tag according to the tag relation table for user selection when at least one tag input by the user is received; and when at least one tag relating to the input tag is selected, adjusting relation between the selected tag and the input tag by using a formula $$conf(A \Rightarrow B) = \frac{Sup(A \cup B) + \text{offset}(A \Rightarrow B)}{Sup(A) + \text{offset}(A \Rightarrow B)}$$

to generate a relation adjustment table.

6. The method for constructing data tag based on a concept relation network as claimed in claim 1, further comprising:
retrieving a personal profile corresponding to the tag relation table when a user logs in;
retrieving a tag input by the user, decreasing relation of each tag relating to the personal profile with a fixed ratio;
adding the input tag to the personal profile if there is no tag similar to the input tag in the tag relation table;
calculating relation between the input tag and at least one existing tag; and
assigning an initial weighting to the input tag.

7. A computer-readable storage medium storing a computer program providing a method for constructing data tag based on a concept relation network, comprising using a computer to perform the steps of:
collecting tags input by a user to create a tag data table;
calculating counts of each tag used according to the tag data table to generate a first tag count table;
comparing, respectively, each tag count value of each tag stored in the first tag count table with a first predefined threshold value;
determining whether each of the tag count values is less than the first predefined threshold value;
discarding tags with tag count values less than the first predefined threshold value to generate a second tag count table;
calculating counts of each tag-pair used according to the second tag data table to generate a first tag-pair count table;
comparing, respectively, each tag-pair count value of each tag-pair stored in the first tag-pair count table with a second predefined threshold value;
determining whether each of the tag-pair count values is less than the second predefined threshold value;
discarding tag-pairs with tag-pair count values less than the second predefined threshold value to generate a second tag-pair count table; and
calculating relations between each tag and other relating tags by using a formula $$conf(A \Rightarrow B) = P(B \mid A) = \frac{Sup(A \cup B)}{Sup(A)}$$

according to the first tag count table and the first tag-pair count table to generate a tag relation table, wherein A represents a tag stored in the first tag count table and B represents a tag, stored in the first tag-pair count table, relating to the tag A.

8. The computer-readable storage medium as claimed in claim 7, further comprising:
adding updated received tags to the first tag count table;
comparing, respectively, each tag count value of each updated tag stored in the first tag count table with the first predefined threshold value;
determining whether each of the tag count values of the updated tags is less than the first predefined threshold value to determine whether contents of the second tag count table have been changed;
if changed, adding the updated tags to the first tag-pair count table according to the second tag count table;
comparing, respectively, each tag-pair count value of each updated tag-pair stored in the first tag-pair count table with the second predefined threshold value; and
discarding tag-pairs with tag-pair count values less than the second predefined threshold value to update the second tag-pair count table.

9. The computer-readable storage medium as claimed in claim 8, further comprising calculating relations between each tag and other relating tags by using the formula $$conf(A \Rightarrow B) = P(B \mid A) = \frac{Sup(A \cup B)}{Sup(A)}$$

according to the first tag count table and the first tag-pair count table to update the tag relation table.

10. The computer-readable storage medium as claimed in claim 8, further comprising, if the contents of the second tag count table are not changed, adding the updated tags to the first tag-pair count table and determining whether update for the second tag-pair count table is required.

11. The computer-readable storage medium as claimed in claim 7, further comprising:
providing tags comprising preferable relations for the input tag according to the tag relation table for user selection when at least one tag input by the user is received; and
when at least one tag relating to the input tag is selected, adjusting relation between the selected tag and the input tag by using a formula $$conf(A \Rightarrow B) = \frac{Sup(A \cup B) + \text{offset}(A \Rightarrow B)}{Sup(A) + \text{offset}(A \Rightarrow B)}$$

to generate a relation adjustment table.

12. The computer-readable storage medium as claimed in claim 7, further comprising:
retrieving a personal profile corresponding to the tag relation table when a user logs in;
retrieving a tag input by the user, decreasing relation of each tag relating to the personal profile with a fixed ratio;
adding the input tag to the personal profile if there is no tag similar to the input tag in the tag relation table;
calculating relation between the input tag and at least one existing tag; and
assigning an initial weighting to the input tag.

13. A system for constructing data tag based on a concept relation network, comprising:
a processor;
a tagging module, collecting tags input by a user to create a tag data table;
a first tag generator, calculating counts of each tag used according to the tag data table to generate a first tag count table, comparing, respectively, each tag count value of each tag stored in the first tag count table with a first predefined threshold value, and determines whether each of the tag count values is less than the first predefined threshold value, and discarding tags with tag count values less than the first predefined threshold value to generate a second tag count table;

a second tag generator, calculating counts of each tag-pair used according to the second tag data table to generate a first tag-pair count table, comparing, respectively, each tag-pair count value of each tag-pair stored in the first tag-pair count table with a second predefined threshold value, and determines whether each of the tag-pair count values is less than the second predefined threshold value, and discarding tag-pairs with tag-pair count values less than the second predefined threshold value to generate a second tag-pair count table;

and a confidence generator, calculating relations between each tag and other relating tags by using a formula $$conf(A \Rightarrow B) = P(B\mid A) = \frac{Sup(A \cup B)}{Sup(A)}$$

according to the first tag count table and the first tag-pair count table to generate a tag relation table, wherein A represents a tag stored in the first tag count table and B represents a tag, stored in the first tag-pair count table, relating to the tag A.

14. The system for constructing data tag based on a concept relation network as claimed in claim 13, further comprising a concept space incremental maintainer, adding updated received tags to the first tag count table, comparing, respectively, each tag count value of each updated tag stored in the first tag count table with the first predefined threshold value, and determines whether each of the tag count values of the updated tags is less than the first predefined threshold value to determine whether contents of the second tag count table have been changed, if changed, adding the updated tags to the first tag-pair count table according to the second tag count table, comparing, respectively, each tag-pair count value of each updated tag-pair stored in the first tag-pair count table with the second predefined threshold value, and discarding tag-pairs with tag-pair count values less than the second predefined threshold value to update the second tag-pair count table.

15. The system for constructing data tag based on a concept relation network as claimed in claim 14, wherein the confidence generator calculates relations between each tag and other relating tags by using the formula $$conf(A \Rightarrow B) = P(B\mid A) = \frac{Sup(A \cup B)}{Sup(A)}$$

according to the first tag count table and the first tag-pair count table to update the tag relation table.

16. The system for constructing data tag based on a concept relation network as claimed in claim 14, wherein, if the contents of the second tag count table are not changed, the concept space incremental maintainer adds the updated tags to the first tag-pair count table and determines whether update for the second tag-pair count table is required.

17. The system for constructing data tag based on a concept relation network as claimed in claim 13, further comprising a concept space adjuster, providing tags comprising preferable relations for the input tag according to the tag relation table for user selection when at least one tag input by the user is received, and, when at least one tag relating to the input tag is selected, adjusting relation between the selected tag and the input tag by using a formula $$conf(A \Rightarrow B) = \frac{Sup(A \cup B) + \text{offset}(A \Rightarrow B)}{Sup(A) + \text{offset}(A \Rightarrow B)}$$

to generate a relation adjustment table.

18. The system for constructing data tag based on a concept relation network as claimed in claim 13, further comprising:
a sign-up module, retrieving a personal profile corresponding to the tag relation table when a user logs in; and
a personalized concept space adapter, retrieving a tag input by the user, decreasing relation of each tag relating to the personal profile with a fixed ratio, adding the input tag to the personal profile if there is no tag similar to the input tag in the tag relation table, calculating relation between the input tag and at least one existing tag, and assigning an initial weighting to the input tag.

19. The system for constructing data tag based on a concept relation network as claimed in claim 18, wherein the personalized concept space adapter increases weightings of the input tag if the tag relation table comprises tags similar to the input tag.

20. The system for constructing data tag based on a concept relation network as claimed in claim 13, wherein the tag data table at least comprises a content identity field and a tag field.

21. The system for constructing data tag based on a concept relation network as claimed in claim 13, wherein the first tag count table at least comprises a tag field and a count field, and a value of each count field representing a used count of a corresponding tag.

22. The system for constructing data tag based on a concept relation network as claimed in claim 13, wherein the second tag count table at least comprises a tag field and a count field, and a value of each count field representing a used count of a corresponding tag which is greater than the first predefined threshold value.

23. The system for constructing data tag based on a concept relation network as claimed in claim 13, wherein the first tag-pair count table at least comprises a tag field and a count field, and a value of each count field representing a used count of a corresponding tag-pair.

24. The system for constructing data tag based on a concept relation network as claimed in claim 13, wherein the second tag-pair count table at least comprises a tag field and a count field, and a value of each count field representing a used count of a corresponding tag-pair which is greater than the second predefined threshold value.

* * * * *